(12) United States Patent
Luo et al.

(10) Patent No.: US 10,187,825 B2
(45) Date of Patent: Jan. 22, 2019

(54) DATA TRANSMISSION METHOD AND APPARATUS

(71) Applicant: Huawei Technologies Co., Ltd., Shenzhen, Guangdong (CN)

(72) Inventors: Yi Luo, Shenzhen (CN); Xun Yang, Shenzhen (CN); Yunjie Yuan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 15/170,718

(22) Filed: Jun. 1, 2016

(65) Prior Publication Data

US 2016/0277973 A1    Sep. 22, 2016

Related U.S. Application Data

(63) Continuation of application No. PCT/CN2013/088315, filed on Dec. 2, 2013.

(51) Int. Cl.
| | |
|---|---|
| *H04W 28/26* | (2009.01) |
| *H04B 7/0452* | (2017.01) |
| *H04L 5/00* | (2006.01) |
| *H04W 72/12* | (2009.01) |

(52) U.S. Cl.
CPC ......... *H04W 28/26* (2013.01); *H04B 7/0452* (2013.01); *H04L 5/0037* (2013.01); *H04W 72/1268* (2013.01)

(58) Field of Classification Search
CPC ........................ H04W 28/26; H04W 72/1268; H04B 7/0452; H04L 5/0037
USPC ................................ 370/310, 345, 347, 348
See application file for complete search history.

(56) References Cited

U.S. PATENT DOCUMENTS

2011/0305205 A1* 12/2011 Gong ................... H04L 1/1861
370/329

FOREIGN PATENT DOCUMENTS

| CN | 101541083 A | 9/2009 |
|---|---|---|
| CN | 103354482 A | 10/2013 |
| EP | 3012989 A1 | 4/2016 |

(Continued)

OTHER PUBLICATIONS

Hu Jin et al., "A MIMO-Based Collision Mitigation Scheme in Uplink WLANs", IEEE Communications Letters, vol. 12, No. 6, Jun. 2008, p. 417-419.

(Continued)

*Primary Examiner* — Obaidul Huq

(57) ABSTRACT

The present invention discloses a data transmission method and apparatus. The method includes: receiving a channel reservation request frame sent by a first station, where the channel reservation request frame is used to request to reserve a transmission resource for the first station for sending uplink data; sending a channel reservation response frame to the first station and M second stations according to the channel reservation request frame, where the channel reservation response frame is used to indicate that the first station and the M second stations are allowed to send uplink data. According to the data transmission method and apparatus of the embodiments of the present invention, time-frequency resources of a system can be reduced when MU-MIMO is implemented, a transmission delay can be shortened, and user experience can be improved.

14 Claims, 4 Drawing Sheets

(56) References Cited

FOREIGN PATENT DOCUMENTS

WO    2012/118258 A1    9/2012

OTHER PUBLICATIONS

Hu Jin et al., A Throughput Balancing Problem between Uplink and Downlink in Multi-user MIMO-based WLAN Systems, IEEE, 2009, 6 pages.
Hu Jin et al., "A Tradeoff Between Single-User and Multi-User MIMO Schemes in Multi-Rate Uplink WLANs", IEEE Transactions on Wireless Communications, vol. 10, No. 10, Oct. 2011, p. 3332-3342.
Tomoya Tandai et al., "An efficient uplink multiuser MIMO protocol in IEEE 802.11 WLANs", IEEE, 2009, p. 1153-1157.
Michelle X. Gong et al., "Multi-User Operation in mmWave Wireless Networks", ICC 2011 proceedings, 6 pages.
Daewon Jung et al., "Opportunistic MAC Protocol for Coordinating Simultaneous Transmissions in Multi-User MIMO Based WLANs", IEEE Communications Letters, vol. 15, No. 8, Aug. 2011, p. 902-904.
Hu Jin et al., "Performance Comparison of Uplink WLANs with Single-user and Multi-user MIMO Schemes", WCNC 2008 proceedings, p. 1854-1859.
"Part 11: Wireless LAN Medium Access Control (MAC) and Physical Layer (PHY) Specifications", IEEE Std 802.11-2012, Mar. 29, 2012, 2793 pages.

\* cited by examiner

DATA TRANSMISSION METHOD AND APPARATUS

CROSS-REFERENCE TO RELATED APPLICATIONS

This application is a continuation of International Patent Application No. PCT/CN2013/088315, filed on Dec. 2, 2013, which is hereby incorporated by reference in its entirety.

TECHNICAL FIELD

Embodiments of the present invention relate to the communications field, and more specifically, to a data transmission method and apparatus.

BACKGROUND

In a conventional radio transmission system, a fading characteristic of a channel is one of main causes of a bit error. In a multiple input multiple output (Multiple Input Multiple Output, "MIMO" for short) technology, a transmit diversity gain may be obtained by using a space time coding technology, so as to expand a channel capacity in a space domain. A spatial multiplexing technology of MIMO includes single user MIMO (Single User MIMO, "SU-MIMO" for short) multiplexing and multi-user MIMO (Multiple User MIMO, "MU-MIMO" for short) multiplexing, where SU-MIMO means that multiple parallel data streams are transmitted between one sending station (Station, "STA" for short) and one receiving station by using multiple antennas. MU-MIMO means that multiple parallel data streams are simultaneously and separately sent between one sending station and multiple receiving stations or between multiple sending stations and one receiving station by using multiple antennas. Currently, an SU-MIMO technology and a downlink MU-MIMO technology are introduced to the Institute of Electrical and Electronics Engineers (Institute of Electrical and Electronics Engineers, "IEEE" for short) 802.11 protocol, and it is a development trend in the future to introduce an uplink MU-MIMO technology to the IEEE 802.11 protocol. In the uplink MU-MIMO technology, multiple stations simultaneously and separately send uplink data to an access point (Access Point, "AP" for short) by using multiple antennas. Correspondingly, the AP separately demodulates the data of the stations by using multiple antennas, to improve space utilization and improve a system throughput.

In an existing uplink MU-MIMO technology, after obtaining a transmission resource through contention, a station sends a Request To Send (Request To Send, "RTS" for short) frame to an access point (Access Point, "AP" for short), and the AP measures a transmission channel between the station and the AP according to the RTS frame of the station, and continues to receive an RTS frame sent by another station until a quantity of received RTS frames is equal to a preset value. Subsequently, the AP replies a Clear To Send (Clear To Send, "CTS" for short) frame to all stations that send RTS frames, to instruct these stations to send uplink data, and separately adds, to the CTS frame sent to all the stations, channel state information (Channel State Information, "CSI" for short) of channels that are measured by the AP and between the AP and the stations. The stations that receive the CTS frame sent by the AP may determine transmission rates according to the CSI indicated in the CTS frame, and simultaneously send uplink data to the AP according to the transmission rates. In the foregoing uplink MU-MIMO technology, each station needs to contend with another station for a transmission resource, and can send an RTS frame to the AP only after obtaining the transmission resource through contention, and network overheads are relatively high. Further, the AP instructs the station to send uplink data only after receiving a preset quantity of RTS frames, which may cause a phenomenon in which the station waits for a relatively long time because the AP cannot receive enough RTS frames in a relatively long time. Consequently, a transmission delay is relatively long, user experience is relatively poor, and time-frequency resources of a system are wasted.

SUMMARY

The present invention provides a data transmission method and apparatus, which can shorten a transmission delay and reduce time-frequency resources of a system.

According to a first aspect, a data transmission method is provided, including: receiving a channel reservation request frame sent by a first station, where the channel reservation request frame is used to request to reserve a transmission resource for the first station for sending uplink data; sending a channel reservation response frame to the first station and M second stations according to the channel reservation request frame, where the channel reservation response frame is used to indicate that the first station and the M second stations are allowed to send uplink data, and M is an integer greater than or equal to 1; and receiving uplink data that is simultaneously sent by the first station and N second stations of the M second stations according to the channel reservation response frame, where N is an integer and $1 \leq N \leq M$.

With reference to the first aspect, in a first possible implementation manner, the channel reservation response frame is further used to indicate a transmission resource threshold for sending uplink data by the M second stations to an access point AP; and a quantity of transmission resources used when each second station of the N second stations sends uplink data is less than or equal to a quantity of transmission resources corresponding to the transmission resource threshold.

With reference to the foregoing possible implementation manner of the first aspect, in a second possible implementation manner, a sum of the quantity of transmission resources corresponding to the transmission resource threshold and a quantity of transmission resources used when the first station sends uplink data is less than or equal to a quantity of currently available transmission resources of the AP.

With reference to the foregoing possible implementation manners of the first aspect, in a third possible implementation manner, the quantity of transmission resources used when the first station sends uplink data is less than or equal to a quantity of transmission resources that the first station requests to reserve by using the channel reservation request frame.

With reference to the foregoing possible implementation manners of the first aspect, in a fourth possible implementation manner, the channel reservation response frame is further used to indicate the quantity of transmission resources used when the first station sends uplink data; and the quantity of transmission resources used when the first station sends uplink data is less than or equal to a quantity of transmission resources indicated in the channel reservation response frame.

With reference to the foregoing possible implementation manners of the first aspect, in a fifth possible implementation manner, the sending a channel reservation response frame to the first station and M second stations according to the channel reservation request frame includes: sending, according to the channel reservation request frame, the channel reservation response frame to all stations associated with the AP.

With reference to the foregoing possible implementation manners of the first aspect, in a sixth possible implementation manner, before the sending a channel reservation response frame to the first station and M second stations according to the channel reservation request frame, the method further includes: grouping stations associated with the AP; and the sending a channel reservation response frame to the first station and M second stations according to the channel reservation request frame includes: sending, according to the channel reservation request frame, the channel reservation response frame to M second stations included in at least one group and to the first station.

With reference to the foregoing possible implementation manners of the first aspect, in a seventh possible implementation manner, the channel reservation request frame includes a quantity of spatial flows that the first station requests to reserve for the first station; and the transmission resource threshold includes a spatial flow threshold.

With reference to the foregoing possible implementation manners of the first aspect, in an eighth possible implementation manner, the channel reservation request frame is a Request To Send RTS frame, and the channel reservation response frame is a Clear To Send CTS frame.

With reference to the foregoing possible implementation manners of the first aspect, in a ninth possible implementation manner, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

With reference to the foregoing possible implementation manners of the first aspect, in a tenth possible implementation manner, at least one bit of reserved bits of the CTS frame is used to indicate the transmission resource threshold, and the reserved bits of the CTS frame include the ninth to the twelfth bits and the fourteenth to the sixteenth bits of the CTS frame.

According to a second aspect, another data transmission method is provided, including: receiving a channel reservation response frame sent by an access point AP, where the channel reservation response frame is used to indicate that a first station and M second stations are allowed to send uplink data, and M is an integer greater than or equal to 1; and sending uplink data to the AP according to the channel reservation response frame.

With reference to the second aspect, in a first possible implementation manner, the channel reservation response frame is further used to indicate a transmission resource threshold for sending uplink data to the AP by the M second stations.

With reference to the foregoing possible implementation manner of the second aspect, in a second possible implementation manner, a sum of a quantity of transmission resources corresponding to the transmission resource threshold and a quantity of transmission resources used when the first station sends uplink data is less than or equal to a quantity of currently available transmission resources of the AP.

With reference to the foregoing possible implementation manners of the second aspect, in a third possible implementation manner, a parameter of a transmission resource used when the first station sends uplink data includes a quantity of spatial flows; and the transmission resource threshold includes a spatial flow threshold.

With reference to the foregoing possible implementation manners of the second aspect, in a fourth possible implementation manner, the sending uplink data to the AP according to the channel reservation response frame includes: if there is to-be-sent uplink data on the second station, sending, by the second station, the uplink data to the AP by using a first transmission resource, where a quantity of the first transmission resources is less than or equal to the quantity of transmission resources corresponding to the transmission resource threshold.

With reference to the foregoing possible implementation manners of the second aspect, in a fifth possible implementation manner, before the receiving a channel reservation response frame sent by an access point AP, the method further includes: if the first station detects that a channel remains in an idle state for a preset time period, sending, by the first station, a channel reservation request frame to the AP, where the channel reservation request frame is used to request to reserve a transmission resource for the first station for sending uplink data to the AP; and the receiving a channel reservation response frame sent by an access point AP includes: receiving, by the first station, the channel reservation response frame that is sent by the AP according to the channel reservation request frame.

With reference to the foregoing possible implementation manners of the second aspect, in a sixth possible implementation manner, the quantity of transmission resources used when the first station sends uplink data is less than or equal to a quantity of transmission resources that the first station requests to reserve by using the channel reservation request frame.

With reference to the foregoing possible implementation manners of the second aspect, in a seventh possible implementation manner, the channel reservation response frame is further used to indicate the quantity of transmission resources used when the first station sends uplink data and the quantity of transmission resources used when the first station sends uplink data is less than or equal to a quantity of transmission resources indicated in the channel reservation response frame.

With reference to the foregoing possible implementation manners of the second aspect, in an eighth possible implementation manner, the channel reservation request frame is a Request To Send RTS frame, and the channel reservation response frame is a Clear To Send CTS frame.

With reference to the foregoing possible implementation manners of the second aspect, in a ninth possible implementation manner, at least one bit of reserved bits of the CTS frame is used to indicate the transmission resource threshold, and the reserved bits of the CTS frame include the ninth to the twelfth bits and the fourteenth to the sixteenth bits of the CTS frame.

With reference to the foregoing possible implementation manners of the second aspect, in a tenth possible implementation manner, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

According to a third aspect, a data transmission apparatus is provided, including: a receiving module, configured to receive a channel reservation request frame sent by a first station, where the channel reservation request frame is used to request to reserve a transmission resource for the first station for sending uplink data; and a sending module, configured to send a channel reservation response frame to the first station and M second stations according to the channel reservation request frame received by the receiving module, where the channel reservation response frame is used to indicate that the first station and the M second stations are allowed to send uplink data, and M is an integer greater than or equal to 1, where the receiving module is further configured to receive uplink data that is simultaneously sent by the first station and N second stations of the M second stations according to the channel reservation response frame sent by the sending module, where N is an integer and $1 \leq N \leq M$.

With reference to the third aspect, in a first possible implementation manner, the channel reservation response frame is further used to indicate a transmission resource threshold for sending uplink data by the M second stations to an access point AP; and a quantity of transmission resources used when each second station of the N second stations sends uplink data is less than or equal to a quantity of transmission resources corresponding to the transmission resource threshold.

With reference to the foregoing possible implementation manner of the third aspect, in a second possible implementation manner, a sum of the quantity of transmission resources corresponding to the transmission resource threshold and a quantity of transmission resources used when the first station sends uplink data is less than or equal to a quantity of currently available transmission resources of the AP.

With reference to the foregoing possible implementation manners of the third aspect, in a third possible implementation manner, the quantity of transmission resources used when the first station sends uplink data is less than or equal to a quantity of transmission resources that the first station requests to reserve by using the channel reservation request frame.

With reference to the foregoing possible implementation manners of the third aspect, in a fourth possible implementation manner, the channel reservation response frame is further used to indicate the quantity of transmission resources used when the first station sends uplink data; and the quantity of transmission resources used when the first station sends uplink data is less than or equal to a quantity of transmission resources indicated in the channel reservation response frame.

With reference to the foregoing possible implementation manners of the third aspect, in a fifth possible implementation manner, the sending module is specifically configured to send, according to the channel reservation request frame received by the receiving module, the channel reservation response frame to all stations associated with the AP.

With reference to the foregoing possible implementation manners of the third aspect, in a sixth possible implementation manner, the apparatus further includes: a grouping module, configured to: before the sending module sends the channel reservation response frame to the first station and the M second stations according to the channel reservation request frame received by the receiving module, group stations associated with the AP, where the sending module is specifically configured to send, according to the channel reservation request frame received by the receiving module, the channel reservation response frame to M second stations included in at least one group obtained after the grouping by the grouping module and the first station.

With reference to the foregoing possible implementation manners of the third aspect, in a seventh possible implementation manner, the channel reservation request frame includes a quantity of spatial flows that the first station requests to reserve for the first station; and the transmission resource threshold includes a spatial flow threshold.

With reference to the foregoing possible implementation manners of the third aspect, in an eighth possible implementation manner, the channel reservation request frame is a Request To Send RTS frame, and the channel reservation response frame is a Clear To Send CTS frame.

With reference to the foregoing possible implementation manners of the third aspect, in a ninth possible implementation manner, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

With reference to the foregoing possible implementation manners of the third aspect, in a tenth possible implementation manner, at least one bit of reserved bits of the CTS frame is used to indicate the transmission resource threshold, and the reserved bits of the CTS frame include the ninth to the twelfth bits and the fourteenth to the sixteenth bits of the CTS frame.

According to a fourth aspect, a data transmission apparatus is provided, including: a receiving module, configured to receive a channel reservation response frame sent by an access point AP, where the channel reservation response frame is used to indicate that a first station and M second stations are allowed to send uplink data, and M is an integer greater than or equal to 1; and a sending module, configured to send uplink data to the AP according to the channel reservation response frame received by the receiving module.

With reference to the fourth aspect, in a first possible implementation manner, the channel reservation response frame is further used to indicate a transmission resource threshold for sending uplink data by the M second stations to the AP.

With reference to the foregoing possible implementation manner of the fourth aspect, in a second possible implementation manner, a sum of a quantity of transmission resources corresponding to the transmission resource threshold and a quantity of transmission resources used when the first station sends uplink data is less than or equal to a quantity of currently available transmission resources of the AP.

With reference to the foregoing possible implementation manners of the fourth aspect, in a third possible implementation manner, a parameter of a transmission resource used when the first station sends uplink data includes a quantity of spatial flows; and the transmission resource threshold includes a spatial flow threshold.

With reference to the foregoing possible implementation manners of the fourth aspect, in a fourth possible implementation manner, the sending module is specifically configured to: if there is to-be-sent uplink data, send the uplink data to the AP by using a first transmission resource, where a quantity of the first transmission resources is less than or equal to the quantity of transmission resources corresponding to the transmission resource threshold.

With reference to the foregoing possible implementation manners of the fourth aspect, in a fifth possible implementation manner, the apparatus further includes a detecting module, configured to: before the receiving module receives the channel reservation response frame sent by the AP, detect whether a channel is in an idle state, where the sending module is further configured to: if the detecting module detects that the channel remains in an idle state for a preset time period, send a channel reservation request frame to the AP, where the channel reservation request frame is used to request to reserve a transmission resource for the first station for sending uplink data to the AP; and the receiving module is specifically configured to receive the channel reservation response frame that is sent by the AP according to the channel reservation request frame sent by the sending module.

With reference to the foregoing possible implementation manners of the fourth aspect, in a sixth possible implementation manner, the quantity of transmission resources used when the first station sends uplink data is less than or equal to a quantity of transmission resources that the first station requests to reserve by using the channel reservation request frame.

With reference to the foregoing possible implementation manners of the fourth aspect, in a seventh possible implementation manner, the channel reservation response frame is further used to indicate the quantity of transmission resources used when the first station sends uplink data; and the quantity of transmission resources used when the first station sends uplink data is less than or equal to a quantity of transmission resources indicated in the channel reservation response frame.

With reference to the foregoing possible implementation manners of the fourth aspect, in an eighth possible implementation manner, the channel reservation request frame is a Request To Send RTS frame, and the channel reservation response frame is a Clear To Send CTS frame.

With reference to the foregoing possible implementation manners of the fourth aspect, in a ninth possible implementation manner, at least one bit of reserved bits of the CTS frame is used to indicate the transmission resource threshold, and the reserved bits of the CTS frame include the ninth to the twelfth bits and the fourteenth to the sixteenth bits of the CTS frame.

With reference to the foregoing possible implementation manners of the fourth aspect, in a tenth possible implementation manner, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

Based on the foregoing technical solutions, according to the data transmission method and apparatus provided by the embodiments of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby shortening a transmission delay and improving user experience.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, a WLAN communications system is used as an example to describe the technical solutions of the embodiments of the present invention, but the technical solutions of the embodiments of the present invention may be applied to various communications systems, such as: a Global System for Mobile Communications (Global System for Mobile communications, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short) system, a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunications System, "UMTS" for short), or a Worldwide Interoperability for Microwave Access (Worldwide Interoperability for Microwave Access, "WiMAX" for short) communications system.

It should be further understood that in the embodiments of the present invention, a station may be a station (Station, STA for short), a terminal (Terminal), a mobile station (Mobile Station, "MS" for short), a mobile terminal (Mobile Terminal), or the like that supports a WLAN communication protocol. The station may communicate with one or more core networks over a radio access network (Radio Access Network, "RAN" for short). For example, the station may be a mobile phone (or referred to as a "cellular" phone) and a computer with a mobile terminal; for example, the station may also be a portable, pocket-sized, handheld, computer built-in, or in-vehicle mobile apparatus, which exchanges voice and/or data with the radio access network.

It should be further understood that in the embodiments of the present invention, an AP may provide an access service for the station. The AP may be an access point in the WLAN, may be a base transceiver station (Base Transceiver Station, "BTS" for short) in GSM or CDMA, may be a NodeB (NodeB) in WCDMA, or may be an evolved NodeB (evolved NodeB, "eNB" or "e-NodeB" for short) in LTE, which is not limited in the present application.

Figure 1:
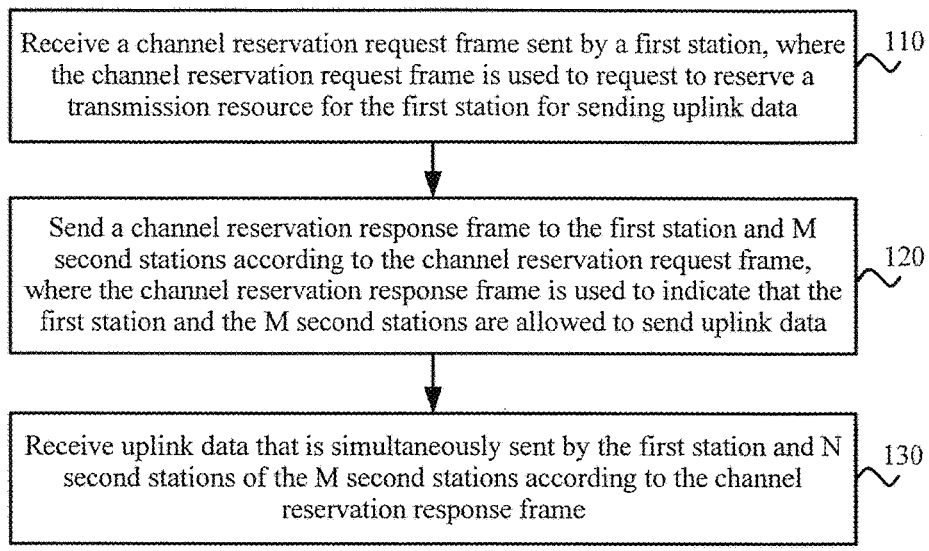
FIG. 1 is a schematic flowchart of a data transmission method according to an embodiment of the present invention.

FIG. 1 shows a schematic flowchart of a data transmission method 100 according to an embodiment of the present invention. The method may be executed by any appropriate network-side device, for example, may be executed by a network element such as an AP or an access controller (Access Controller, "AC" for short). For ease of description, the following provides descriptions by using an example in which the method 100 is executed by an AP, but this embodiment of the present invention is not limited thereto. As shown in FIG. 1, the method 100 includes:

S110: Receive a channel reservation request frame sent by a first station, where the channel reservation request frame is used to request to reserve a transmission resource for the first station for sending uplink data.

S120: Send a channel reservation response frame to the first station and M second stations according to the channel reservation request frame, where the channel reservation response frame is used to indicate that the first station and the M second stations are allowed to send uplink data, and M is an integer greater than or equal to 1.

S130: Receive uplink data that is simultaneously sent by the first station and N second stations of the M second stations according to the channel reservation response frame, where N is an integer and 1≤N≤M.

Therefore, according to the data transmission method in this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

In this embodiment of the present invention, when the first station has uplink data to send, the first station may first contend with another station for a transmission resource. Specifically, the first station may listen to a channel, and if the channel remains in an idle state in a listening time period, the first station sets a random time period to perform backoff (backoff), and if the channel remains in an idle state before the backoff is finished, the first station has successfully contended for the transmission resource. Optionally, the listening time period may be a distributed interframe space (Distributed interframe space, "DIFS" for short), or another time period. The random time period may be a random time length greater than zero and less than a contention window size, which is not limited in this embodiment of the present invention.

If the first station has successfully contended for the transmission resource, the first station may send the channel reservation request frame to the AP, to request a station and the AP that receive the channel reservation request frame to reserve a specific quantity of transmission resources for the first station, so that the first station sends uplink data to the AP by using the quantity of transmission resources. Optionally, the channel reservation request frame may be used to request to reserve only specific transmission duration for the first station. The channel reservation request frame may also carry a quantity of spatial flows that the first station requests to reserve, and may further carry transmission bandwidth that the first station requests to reserve and/or a cache queue length of the first station. Optionally, the channel reservation request frame may further carry other information, but this embodiment of the present invention is not limited thereto.

After receiving the channel reservation request frame, the AP may send the channel reservation response frame to the first station and the M second stations, to indicate that the first station and the M second stations are allowed to send uplink data. Each second station of the M second stations that receive the channel reservation response frame may view whether there is to-be-sent uplink data on the second station, and if there is to-be-sent uplink data on the second station, the second station may send the uplink data to the AP by using a specific quantity of transmission resources. If there is to-be-sent data on N second stations of the M second stations, after receiving the channel reservation response frame, the first station and the N second stations may simultaneously send uplink data after a preset time interval, where the preset time interval may be a short interframe space (Short Interframe Space, "SIFS" for short), or another time interval. In this case, the first station and the N second stations perform uplink data transmission in same transmission duration by separately using different transmission resources, which is not limited in this embodiment of the present invention.

A quantity of transmission resources used when the first station sends uplink data may be equal to a quantity of transmission resources that the first station requests to reserve by using the channel reservation request frame, for example, a quantity of spatial flows. Optionally, if the channel reservation request frame is used to request to reserve only specific transmission duration for the first station, the first station may determine a quantity of transmission resources such as to-be-used spatial flows except the transmission duration according to a transmission capability of the first station or a quantity of pieces of to-be-sent data, but this embodiment of the present invention is not limited thereto.

The second station may determine, according to a quantity of transmission resources corresponding to a transmission capability of the second station, a quantity of transmission resources used when the second station sends uplink data. For example, it is assumed that each second station has at most two antennas, and then each second station of the N second stations can send uplink data by using at most two spatial flows. Optionally, the AP may preset a transmission resource threshold used for sending uplink data by the second station. For example, the AP may preset or set by default that the second station can send an uplink resource only on a secondary channel other than a primary channel, then the first station may send uplink data on the primary channel, and the second station may send uplink data on the secondary channel, but this embodiment of the present invention is not limited thereto.

Optionally, in another embodiment, the channel reservation response frame is further used to indicate a transmission resource threshold for sending uplink data by the M second stations to the access point AP.

A quantity of transmission resources used when each second station of the N second stations sends uplink data is less than or equal to a quantity of transmission resources corresponding to the transmission resource threshold.

A transmission resource parameter corresponding to the transmission resource threshold may be consistent with a parameter of the transmission resource that the first station requests to reserve by using the channel reservation request frame. If the channel reservation request frame is used to request to reserve a quantity of spatial flows for the first station, the transmission resource threshold may include a maximum value of the quantity of spatial flows.

Optionally, the channel reservation request frame includes a quantity of spatial flows that the first station requests to reserve for the first station. Correspondingly, the transmission resource threshold includes a spatial flow threshold.

Specifically, the transmission resource threshold may include a threshold of each transmission resource parameter of at least one transmission resource parameter, for example, a spatial flow threshold or a transmission bandwidth threshold. The threshold of each transmission resource parameter may include one or more values, or include one or more expressions. Correspondingly, the channel reservation response frame may indicate that the M second stations have a same transmission resource threshold when sending uplink data to the AP, or may indicate that one or more second stations of the M second stations have a transmission resource threshold different from that of the other second stations. Optionally, when the M second stations belong to different groups, second stations in the different groups may have different transmission resource thresholds, which is not limited in this embodiment of the present invention.

In this case, each second station of the M second stations that receive the channel reservation response frame may view whether there is to-be-sent uplink data on the second station; if there is to-be-sent uplink data on the second station, the second station may further determine whether a quantity of transmission resources required by the to-be-sent uplink data exceeds the quantity of transmission resources corresponding to the transmission resource threshold; if the quantity of transmission resources required by the to-be-sent uplink data does not exceed the quantity of transmission resources corresponding to the transmission resource threshold, the second station may send the to-be-sent uplink data to the AP; and if the quantity of transmission resources required by the to-be-sent uplink data exceeds the quantity of transmission resources corresponding to the transmission resource threshold, the second station may not send the to-be-sent uplink data, or segment the to-be-sent uplink data, and send a part of the uplink data to the AP by using transmission resources that meets the quantity of transmission resources limited by the transmission resource threshold. In this way, the quantity of transmission resources used when each second station of the N second stations sends uplink data may be less than or equal to the quantity of transmission resources corresponding to the transmission resource threshold, but this embodiment of the present invention is not limited thereto.

The AP may determine the transmission resource threshold in multiple manners. Optionally, if the channel reservation request frame is used to request to reserve only specific transmission duration for the first station, the AP may allocate another transmission resource such as a quantity of spatial flows except the transmission duration to the first station according to the channel reservation request frame, and further determine a transmission resource threshold for sending uplink data by the second station to the AP. Optionally, in another embodiment, the AP may predict a quantity of transmission resources such as a quantity of spatial flows possibly used by the first station, and determine the transmission resource threshold according to the predicted quantity of transmission resources, but this embodiment of the present invention is not limited thereto. Optionally, if the channel reservation request frame is further used to request to reserve a specific quantity of other transmission resources such as a quantity of spatial flows except the transmission duration for the first station, the AP may determine, according to the quantity of transmission resources that the first station requests to reserve by using the channel reservation request frame, a quantity of transmission resources occupied when the first station sends uplink data, and then the AP may determine, according to a quantity of currently available transmission resources and the quantity of transmission resources occupied when the first station sends uplink data, a quantity of remaining transmission resources, and determine, according to the quantity of remaining transmission resources, a transmission resource threshold for sending uplink data by the second station to the AP, where a quantity of transmission resources corresponding to the transmission resource threshold may be less than or equal to the quantity of remaining transmission resources, but this embodiment of the present invention is not limited thereto.

Optionally, a sum of the quantity of transmission resources corresponding to the transmission resource threshold and the quantity of transmission resources used when the first station sends uplink data is less than or equal to a quantity of currently available transmission resources of the AP, so as to reduce a probability of a transmission collision between the first station and the second station.

Optionally, in this embodiment of the present invention, the AP may not have a function of adjusting, according to the channel reservation request frame, a quantity of transmission resources reserved for the first station. That is, the first station requests transmission resources of a quantity, and the AP reserves transmission resources of the quantity for the first station. Correspondingly, the quantity of transmission resources used when the first station sends uplink data is less than or equal to the quantity of transmission resources that the first station requests to reserve by using the channel reservation request frame.

In this case, the sum of the quantity of transmission resources that the first station requests to reserve by using the channel reservation request frame and the quantity of transmission resources corresponding to the transmission resource threshold indicated in the channel reservation response frame is less than or equal to the quantity of currently available transmission resources of the AP. For example, the sum of a quantity of spatial flows that the first station requests to reserve by using the channel reservation request frame and a spatial flow threshold indicated in the channel reservation response frame is less than or equal to a quantity of currently available spatial flows of the AP, but this embodiment of the present invention is not limited thereto.

Optionally, in another embodiment, the AP may have a function of adjusting, according to the channel reservation request frame, a quantity of transmission resources reserved for the first station. Correspondingly, a quantity of transmission resources that the AP reserves for the first station may be equal to the quantity of transmission resources that the first station requests to reserve by using the channel reservation request frame, or may be unequal to the quantity of transmission resources that the first station requests to reserve by using the channel reservation request frame, but this embodiment of the present invention is not limited thereto.

In this case, the AP may further indicate, in the channel reservation response frame, the quantity of transmission resources used when the first station sends uplink data. Correspondingly, the quantity of transmission resources used when the first station sends uplink data is less than or equal to a quantity of transmission resources indicated in the channel reservation response frame.

In this case, the quantity, indicated in the channel reservation response frame, of transmission resources to be used by the first station may be less than or equal to the quantity of transmission resources that the first station requests to reserve by using the channel reservation request frame. Optionally, if the quantity of transmission resources to be used by the first station is explicitly indicated in the channel reservation response frame, the quantity of transmission resources used when the first station sends uplink data may be less than or equal to the explicitly indicated quantity of transmission resources; and if the quantity of transmission resources to be used by the first station is not explicitly indicated in the channel reservation response frame, it may indicate that the AP does not adjust the quantity of transmission resources that the first station requests to reserve. Correspondingly, the quantity of transmission resources used when the first station sends uplink data may be less than or equal to the quantity of transmission resources that the first station requests to reserve by using the channel reservation request frame, but this embodiment of the present invention is not limited thereto.

Optionally, the AP may send the channel reservation response frame to all stations associated with the AP. Correspondingly, S120 of sending a channel reservation response frame to the first station and M second stations according to the channel reservation request frame includes:

S121: Send, according to the channel reservation request frame, the channel reservation response frame to all stations associated with the AP.

In this case, multiple second stations of the M second stations may have uplink data to be sent, and in order to avoid a collision that occurs when the first station and the multiple second stations simultaneously send data to the AP, the quantity of transmission resources corresponding to the transmission resource threshold may be less than the quantity of remaining transmission resources, and a specific value thereof may be determined according to an actual condition, but this embodiment of the present invention is not limited thereto.

Figure 2:
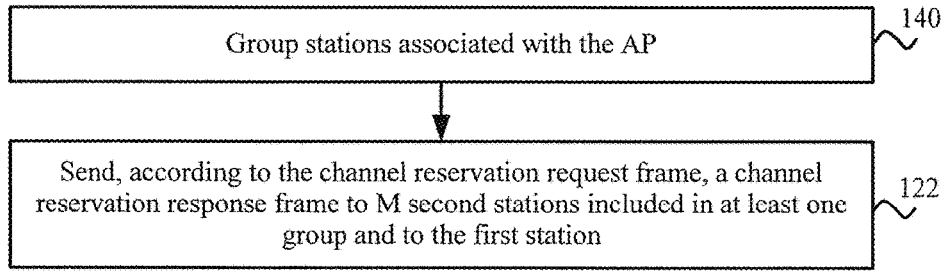
FIG. 2 is another schematic flowchart of a data transmission method according to an embodiment of the present invention.

Optionally, in another embodiment, in order to avoid a collision that occurs because a total quantity of transmission resources occupied by the first station and the second stations exceeds the quantity of currently available transmission resources of the AP in a case in which too many stations simultaneously send uplink data to the AP, the AP may group some or all of the stations associated with the AP, and then send the channel reservation response frame to stations in one or more groups. That is, the M second stations belong to one or more groups. In this way, a probability of a transmission collision between stations may be reduced by reducing a value of M. As shown in FIG. 2, before S120, the method 100 further includes:

S140: Group stations associated with the AP.

Correspondingly, S120 of sending a channel reservation response frame to the first station and M second stations according to the channel reservation request frame includes:

S122: Send, according to the channel reservation request frame, the channel reservation response frame to M second stations included in at least one group and to the first station.

The AP may group, in multiple manners, the stations associated with the AP. Optionally, the AP may group, according to a service type or a service cycle, the stations associated with the AP. For example, the AP groups stations of a same service type into one group. In this way, lengths of to-be-transmitted services of the M second stations are identical or similar, so that N second stations of the M second stations simultaneously send uplink data to the AP. Alternatively, the AP may further group stations with a same or similar service cycle into one group, and send the channel reservation response frame to stations included in one or more groups with a service cycle identical with or similar to that of the first station, but this embodiment of the present invention is not limited thereto.

Optionally, in another embodiment, the channel reservation request frame and the channel reservation response frame may be newly added frames, or existing frames in the prior art. Optionally, the channel reservation request frame may be an RTS frame, and the channel reservation response frame may be a CTS frame. In this way, a process in which the first station sends uplink data may be compatible with the existing IEEE 802.11 protocol.

Optionally, the RTS frame may be used to request to reserve only specific transmission duration for the first station, so as to maintain a frame structure the same as that of the prior art, and the AP may indicate, in the CTS frame, a transmission resource threshold for sending uplink data by the second station, or indicate, in the CTS frame, another transmission resource parameter for sending uplink data by the first station, but this embodiment of the present invention is not limited thereto. Optionally, in another embodiment, the RTS frame may be used to further request another transmission resource except the transmission duration reserved for the first station. In this case, the first station may indicate, in the RTS frame in multiple manners, the transmission resource that the first station requests to reserve. Specifically, the first station may indicate, by adding a bit to the RTS frame, the transmission resource that the first station requests to reserve, or indicate, by using a bit with no practical meaning in an existing RTS frame, the transmission resource that the first station requests to reserve, but this embodiment of the present invention is not limited thereto.

Optionally, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

The reserved bits of the RTS frame include the ninth to the twelfth bits and the fourteenth to the sixteenth bits of the RTS frame, where reserved bits in the existing RTS frame have no practical meaning. Compared with a manner in which a new bit is added to the RTS frame, a manner in which at least one bit of the reserved bits is used to indicate the transmission resource that the first station requests to reserve can reduce a quantity of bits occupied by the RTS frame and reduce system overheads. Optionally, if the RTS frame carries a quantity of spatial flows, transmission duration, and transmission bandwidth that the first station requests to reserve, the AP may divide the reserved bits into three parts, which are respectively used to indicate the quantity of spatial flows, the transmission duration, and the transmission bandwidth. Assuming that numbers of the ninth to the twelfth bits and the fourteenth to the sixteenth bits are B8 to B11 and B13 to B15, an optional solution is: B8 to B9 are used to indicate the transmission bandwidth, B10 to B11 are used to indicate the transmission duration, and B13 to B15 are used to indicate the quantity of spatial flows. Optionally, the B8 to B9 may have four states of 0 to 3 in total, which respectively represent that the transmission bandwidth is 20 MHz, 40 MHz, 80 MHz, and 160 MHz; the B10 to B11 may have four states of 0 to 3 in total, which respectively represent that the transmission duration is 1t, 2t, 3t, and 4t, where t may be a unit time length of the transmission duration, and a value of t is not limited in this embodiment of the present invention; and B13 to B15 may have eight states of 0 to 7 in total, which respectively represent one to eight spatial flows. Optionally, different states of the B8 to B9, B10 to B11, and B13 to B15 may represent transmission resources of another quantity, which is not limited in this embodiment of the present invention.

Optionally, in another embodiment, the first station may further indicate the transmission bandwidth in the RTS frame by using a dynamic bandwidth operation (Dynamic bandwidth operation) mechanism, and indicate, by using the reserved bits of the RTS frame, the quantity of spatial flows and the transmission duration that the first station requests to reserve. Specifically, a dynamic bandwidth indicator bit (that is, the fifth bit) of a scrambling code sequence of the RTS frame may indicate that dynamic bandwidth is used. For example, the dynamic bandwidth indicator bit is set to 1, and bits (for example, the sixth and the seventh bits of the scrambling code sequence) after the dynamic bandwidth indicator bit indicate the transmission bandwidth, but this embodiment of the present invention is not limited thereto. Correspondingly, the reserved bits of the RTS frame may be divided into two parts, which are respectively used to indicate the quantity of spatial flows and the transmission duration. For example, B8 to B11 are used to indicate the transmission duration, and B13 to B15 are used to indicate the quantity of spatial flows, but this embodiment of the present invention is not limited thereto.

Optionally, in another embodiment, the AP may indicate the transmission resource threshold in the CTS frame in multiple manners. Specifically, the AP may indicate the transmission resource threshold by adding a bit to the CTS frame, or indicate the transmission resource threshold by using a bit with no practical meaning in an existing CTS frame, but this embodiment of the present invention is not limited thereto.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

The reserved bits of the CTS frame include the ninth to the twelfth bits and the fourteenth to the sixteenth bits of the CTS frame, where reserved bits in the existing CTS frame have no practical meaning. Compared with a manner in which a new bit is added to the CTS frame, a manner in which at least one bit of the reserved bits is used to indicate the transmission resource threshold can reduce a quantity of bits occupied by the CTS frame. Optionally, if the transmission resource threshold includes a spatial flow threshold value, a transmission duration threshold value, and a transmission bandwidth threshold value, the AP may divide the reserved bits into three parts, which are respectively used to indicate the spatial flow threshold value, the transmission duration threshold value, and the transmission bandwidth threshold value. Assuming that numbers of the ninth to the twelfth bits and the fourteenth to the sixteenth bits are B8 to B11 and B13 to B15, an optional solution is: B8 to B9 are used to indicate the transmission bandwidth threshold value, B10 to B11 are used to indicate the transmission duration threshold value, and 313 to 315 are used to indicate the spatial flow threshold value. Optionally, the 38 to B9 may have four states of 0 to 3 in total, which respectively represent that the transmission bandwidth threshold value is 20 MHz, 40 MHz, 80 MHz, and 160 MHz; the B10 to B11 may have four states of 0 to 3 in total, which respectively represent that the transmission duration threshold value is 1t, 2t, 3t, and 4t, where t may be a unit time length of transmission duration, and a value of t is not limited in this embodiment of the present invention; and B13 to B15 may have eight states of 0 to 7 in total, which respectively represent one to eight spatial flows. Optionally, different states of the B8 to B9, B10 to B11, and B13 to B15 may represent transmission resource threshold values of another quantity, which is not limited in this embodiment of the present invention.

Optionally, in another embodiment, the AP may further indicate the transmission duration threshold value by using a scrambling code sequence of the CTS frame, but this embodiment of the present invention is not limited thereto.

Therefore, according to the data transmission method in this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

Figure 3:
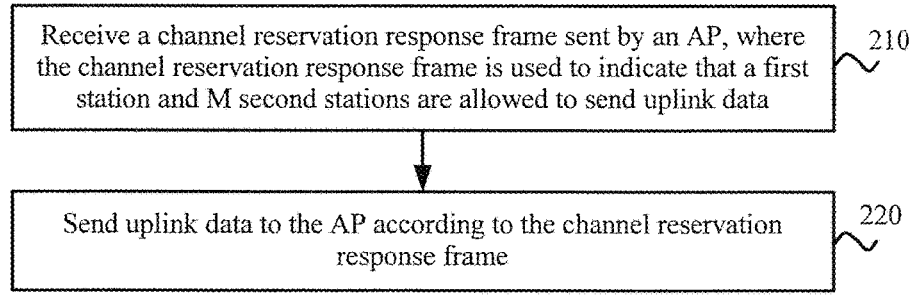
FIG. 3 is a schematic flowchart of a data transmission method according to another embodiment of the present invention.
Figure 4:
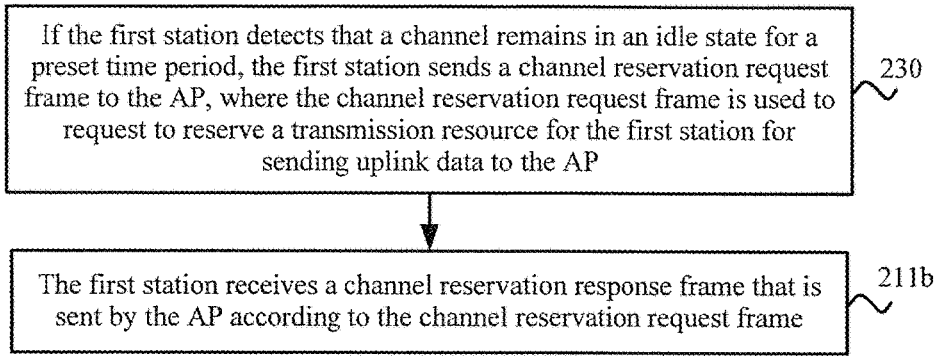
FIG. 4 is another schematic flowchart of a data transmission method according to another embodiment of the present invention.

The foregoing describes in detail the data transmission method according to the embodiment of the present invention from a perspective of an AP with reference to FIG. 1 and FIG. 2, and the following describes in detail a data transmission method according to an embodiment of the present invention from a perspective of a station with reference to FIG. 3 and FIG. 4.

FIG. 3 shows a schematic flowchart of a data transmission method 200 according to another embodiment of the present invention. The method 200 may be executed by a station. As shown in FIG. 3, the method 200 includes:

S210: Receive a channel reservation response frame sent by an access point AP, where the channel reservation response frame is used to indicate that a first station and M second stations are allowed to send uplink data, and M is an integer greater than or equal to 1.

S220: Send uplink data to the AP according to the channel reservation response frame.

Therefore, according to the data transmission method in this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

After receiving a channel reservation request frame that is sent by the first station and is used to request to reserve a specific quantity of transmission resources for the first station, the AP may send the channel reservation response frame to the first station and the M second stations according to the channel reservation request frame.

Optionally, the channel reservation response frame is further used to indicate a transmission resource threshold for sending uplink data by the M second stations to the AP.

Optionally, in another embodiment, a sum of a quantity of transmission resources corresponding to the transmission resource threshold and a quantity of transmission resources used when the first station sends uplink data is less than or equal to a quantity of currently available transmission resources of the AP.

Optionally, if the channel reservation response frame indicates that the first station is allowed to send uplink data but does not indicate a quantity of transmission resources to be used by the first station, the quantity of transmission resources used when the first station sends uplink data is less than or equal to a quantity of transmission resources that the first station requests to reserve by using the channel reservation request frame.

Optionally, in another embodiment, the channel reservation response frame is further used to indicate the quantity of transmission resources used when the first station sends uplink data.

The quantity of transmission resources used when the first station sends uplink data is less than or equal to a quantity of transmission resources indicated in the channel reservation response frame.

The quantity of transmission resources indicated in the channel reservation response frame may be less than or equal to the quantity of transmission resources that the first station requests to reserve by using the channel reservation request frame. Optionally, if the quantity of transmission resources to be used by the first station is explicitly indicated in the channel reservation response frame, the quantity of transmission resources used when the first station sends uplink data may be less than or equal to the explicitly indicated quantity of transmission resources; and if the quantity of transmission resources to be used by the first station is not explicitly indicated in the channel reservation response frame, it may indicate that the AP does not adjust the quantity of transmission resources that the first station requests to reserve. Correspondingly, the quantity of transmission resources used when the first station sends uplink data may be less than or equal to the quantity of transmission resources that the first station requests to reserve by using the channel reservation request frame, but this embodiment of the present invention is not limited thereto.

Optionally, a parameter of a transmission resource reserved for the first station includes: a quantity of spatial flows reserved for the first station; and the transmission resource threshold includes a spatial flow threshold.

Optionally, in another embodiment, the transmission resources reserved for the first station may further include another resource such as transmission bandwidth reserved for the first station. Accordingly, the transmission resource threshold may further include a threshold of the another resource parameter such as transmission bandwidth, but this embodiment of the present invention is not limited thereto.

Optionally, if the method 200 is executed by the second station, that is, the second station receives the channel reservation response frame sent by the AP, the second station may view whether there is to-be-sent uplink data on the second station; if there is to-be-sent uplink data on the second station, the second station may further determine whether a quantity of transmission resources required by the to-be-sent uplink data exceeds the quantity of transmission resources corresponding to the transmission resource threshold; if the quantity of transmission resources required by the to-be-sent uplink data does not exceed the quantity of transmission resources corresponding to the transmission resource threshold, the second station may send the to-be-sent uplink data to the AP; and if the quantity of transmission resources required by the to-be-sent uplink data exceeds the quantity of transmission resources corresponding to the transmission resource threshold, the second station may not send the to-be-sent uplink data, or segment the to-be-sent uplink data, and send a part of the uplink data to the AP by using transmission resources that meets the quantity of transmission resources limited by the transmission resource threshold, but this embodiment of the present invention is not limited thereto.

Correspondingly, S220 of sending uplink data to the AP according to the channel reservation response frame includes:

S221a: If there is to-be-sent uplink data on the second station, the second station sends the uplink data to the AP by using a first transmission resource, where a quantity of the first transmission resources is less than or equal to the quantity of transmission resources corresponding to the transmission resource threshold.

Optionally, in another embodiment, if the method 200 is executed by the first station, before the first station receives the channel reservation response frame sent by the AP, the first station may send a channel reservation request frame to the AP. As shown in FIG. 4, before S210, the method 200 further includes:

S230: If the first station detects that a channel remains in an idle state for a preset time period, the first station sends a channel reservation request frame to the AP, where the channel reservation request frame is used to request to reserve a transmission resource for the first station for sending uplink data to the AP.

Correspondingly, S210 of receiving a channel reservation response frame sent by an AP includes:

S211b: The first station receives the channel reservation response frame that is sent by the AP according to the channel reservation request frame.

The first station may contend with another station for a transmission resource, and send the channel reservation request frame to the AP after obtaining the transmission resource through contention, where the channel reservation request frame is used to request the AP that receives the channel reservation request frame to reserve a transmission resource for the first station for sending uplink data. The AP may determine, according to the channel reservation request frame, a transmission resource threshold for sending uplink data by the M second stations, and send the channel reservation response frame to the first station and the M second stations, where the channel reservation response frame is used to indicate that the first station is allowed to send uplink data and indicate the transmission resource threshold of the M second stations. After receiving the channel reservation response frame, the first station and N second stations of the M second stations may send uplink data to the AP after a preset time period, but this embodiment of the present invention is not limited thereto.

Optionally, in another embodiment, in order to be compatible with the existing IEEE 802.11 protocol, the channel reservation request frame is a Request To Send RTS frame, and the channel reservation response frame is a Clear To Send CTS frame.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

Optionally, in another embodiment, at least one bit of reserved bits of the RTS frame is used to indicate the transmission resource that the first station requests to reserve for the first station, and the reserved bits of the RTS frame include the ninth to the twelfth bits and the fourteenth to the sixteenth bits of the RTS frame.

Therefore, according to the data transmission method in this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

Figure 5:
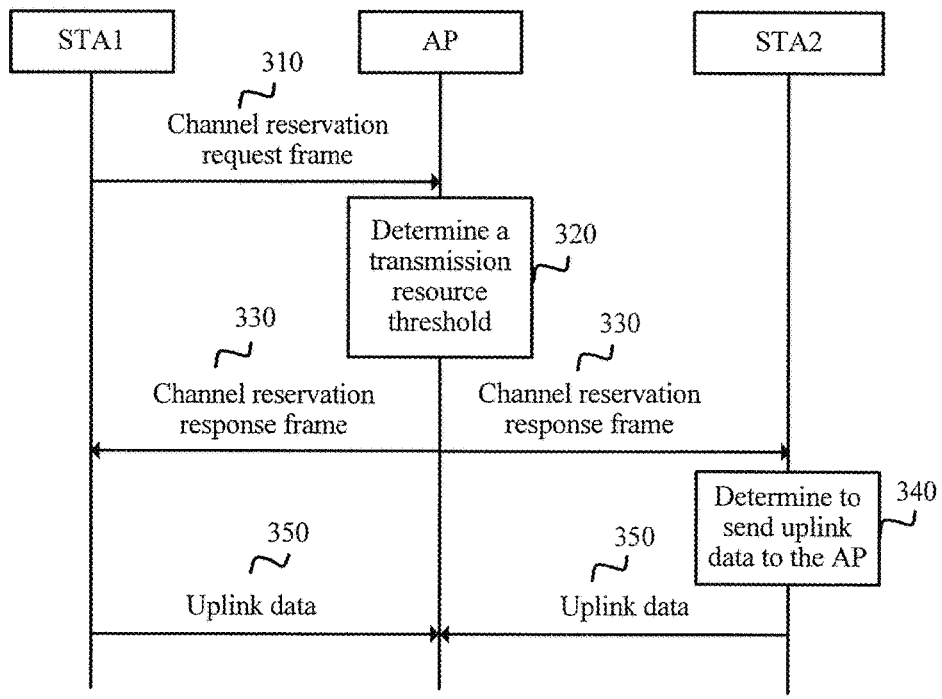
FIG. 5 is a schematic flowchart of a data transmission method according to still another embodiment of the present invention.

The following more specifically describes a data transmission method provided in an embodiment of the present invention with reference to a specific example. FIG. 5 shows a schematic flowchart of a data transmission method 300 according to still another embodiment of the present invention. For ease of description, it is assumed below that a first station is a STA1, and that a second station is a STA2, but this embodiment of the present invention is not limited thereto. As shown in FIG. 5, the method 300 includes:

S310: The STA1 sends a channel reservation request frame to an AP, where the channel reservation request frame is used to request to reserve a transmission resource for the STA1 for sending uplink data.

The channel reservation request frame may carry transmission duration that the STA1 requests to reserve, or carry a quantity of spatial flows that the STA1 requests to reserve for the STA1, or may further carry transmission bandwidth that the STA1 requests to reserve and/or a cache queue length of the STA1, but this embodiment of the present invention is not limited thereto.

S320: The AP determines, according to the channel reservation request frame, a transmission resource threshold for sending uplink data by the STA2 to the AP.

After receiving the channel reservation request frame, the AP may determine, according to information carried by the channel reservation request frame, a quantity of transmission resources occupied when the STA1 sends uplink data, where the quantity, determined by the AP, of transmission resources occupied when the STA1 sends uplink data may be equal or unequal to a quantity of transmission resources that the STA1 requests to reserve by using the channel reservation request frame. The AP may determine a quantity of remaining transmission resources according to a quantity of currently available transmission resources of the AP and the quantity of transmission resources used when the STA1 sends uplink data, and determine, according to the quantity of remaining transmission resources, a transmission resource threshold for sending uplink data by the STA2 to the AP, where a quantity of transmission resources corresponding to the transmission resource threshold may be less than or equal to the quantity of remaining transmission resources, to reduce a probability of a collision that occurs when the stations simultaneously send data to the AP. Correspondingly, the sum of the quantity of transmission resources corresponding to the transmission resource threshold and the quantity of transmission resources used when the STA1 sends uplink data is less than or equal to the quantity of currently available transmission resources of the AP, but this embodiment of the present invention is not limited thereto.

S330: The AP sends a channel reservation response frame to the STA1 and the STA2, where the channel reservation response frame is used to indicate that the STA1 is allowed to send data and indicate the transmission resource threshold for sending uplink data by the STA2.

Optionally, a quantity of transmission resources used when the STA2 sends uplink data may be less than or equal to the transmission resource threshold, and the channel reservation response frame may further used to indicate the quantity of uplink resources used when the STA1 sends uplink data, but this embodiment of the present invention is not limited thereto.

S340: The STA2 determines, according to the channel reservation response frame, to send uplink data to the AP.

The STA2 may view whether there is to-be-sent uplink data on the STA2, if there is to-be-sent uplink data on the STA2, the STA2 may further determine whether a quantity of transmission resources required by the to-be-sent uplink data exceeds the quantity of transmission resources corresponding to the transmission resource threshold; if the quantity of transmission resources required by the to-be-sent uplink data does not exceed the quantity of transmission resources corresponding to the transmission resource threshold, the STA2 may send the to-be-sent uplink data to the AP; and if the quantity of transmission resources required by the to-be-sent uplink data exceeds the quantity of transmission resources corresponding to the transmission resource threshold, the STA2 may segment the to-be-sent uplink data, and send a part of the uplink data to the AP by using transmission resources that meets the quantity of transmission resources limited by the transmission resource threshold, but this embodiment of the present invention is not limited thereto.

S350: The STA1 and the STA2 simultaneously send uplink data to the AP.

After receiving the channel reservation response frame, the STA1 and the STA2 may simultaneously send uplink data after a preset time interval, where the preset time interval may be an SIFS, or another time interval. Further, the STA1 and the STA2 may send uplink data by using different transmission resources in the transmission duration that the STA1 and the STA2 request to reserve by using the channel reservation request frame, but this embodiment of the present invention is not limited thereto.

Therefore, according to the data transmission method in this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

It should be noted that, the example of FIG. 5 is only intended for helping a person skilled in the art better understand the embodiments of the present invention, other than limiting the scope of the embodiments of the present invention. A person skilled in the art may apparently perform various equivalent modification or variation according to the example of FIG. 5, and such modification or variation also falls within the scope of the embodiments of present invention.

It should be understood that, sequence numbers in the foregoing processes do not indicate execution sequences, and the execution sequences of the processes should be determined according to the functions and internal logic of the processes, and the sequence numbers should not constitute any limitation to the implementation of this embodiment of the present invention.

The foregoing describes in detail the data transmission methods according to the embodiments of the present invention with reference to FIG. 1 to FIG. 5, and the following describes data transmission apparatuses according to embodiments of the present invention with reference to FIG. 6 to FIG. 10.

Figure 6:
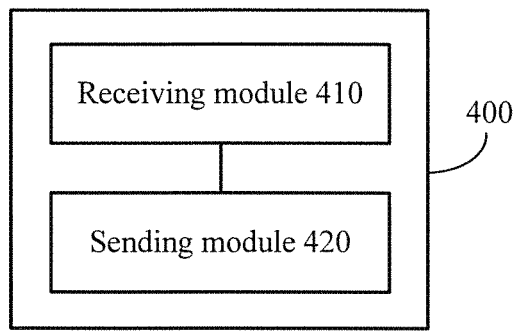
FIG. 6 is a schematic block diagram of a data transmission apparatus according to an embodiment of the present invention.

FIG. 6 shows a schematic block diagram of a data transmission apparatus 400 according to an embodiment of the present invention. As shown in FIG. 6, the apparatus 400 includes:
- a receiving module 410, configured to receive a channel reservation request frame sent by a first station, where the channel reservation request frame is used to request to reserve a transmission resource for the first station for sending uplink data; and
- a sending module 420, configured to send a channel reservation response frame to the first station and M second stations according to the channel reservation request frame received by the receiving module 410, where the channel reservation response frame is used to indicate that the first station and the M second stations are allowed to send uplink data, and M is an integer greater than or equal to 1.

The receiving module 410 is further configured to receive uplink data that is simultaneously sent by the first station and N second stations of the M second stations according to the channel reservation response frame sent by the sending module 420, where N is an integer and $1 \leq N \leq M$.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

Optionally, the channel reservation response frame is further used to indicate a transmission resource threshold for sending uplink data by the M second stations to an access point AP. Correspondingly, a quantity of transmission resources used when each second station of the N second stations sends uplink data is less than or equal to a quantity of transmission resources corresponding to the transmission resource threshold.

Optionally, a sum of the quantity of transmission resources corresponding to the transmission resource threshold and a quantity of transmission resources used when the first station sends uplink data is less than or equal to a quantity of currently available transmission resources of the AP.

Optionally, in another embodiment, the quantity of transmission resources used when the first station sends uplink data is less than or equal to a quantity of transmission resources that the first station requests to reserve by using the channel reservation request frame.

Optionally, in another embodiment, the channel reservation response frame is further used to indicate the quantity of transmission resources used when the first station sends uplink data.

Correspondingly, the quantity of transmission resources used when the first station sends uplink data is less than or equal to a quantity of transmission resources indicated in the channel reservation response frame.

Optionally, the sending module 420 is specifically configured to send, according to the channel reservation request frame received by the receiving module 410, the channel reservation response frame to all stations associated with the AP.

Figure 7:
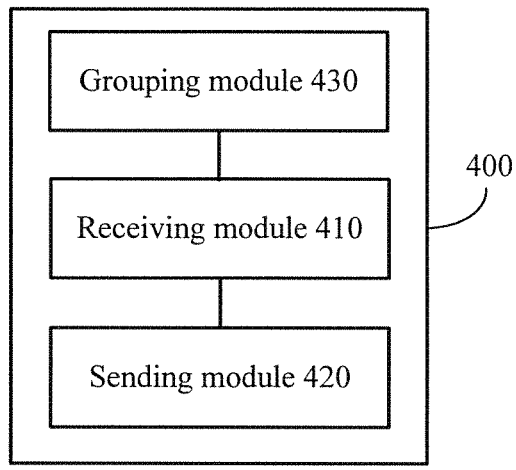
FIG. 7 is another schematic block diagram of a data transmission apparatus according to an embodiment of the present invention.

Optionally, in another embodiment, as shown in FIG. 7, the apparatus 400 further includes:
- a grouping module 430, configured to: before the sending module 420 sends the channel reservation response frame to the first station and the M second stations according to the channel reservation request frame received by the receiving module 410, group stations associated with the AP.

The sending module 420 is specifically configured to send, according to the channel reservation request frame received by the receiving module 410, the channel reservation response frame to M second stations included in at least one group obtained after the grouping by the grouping module 430 and the first station.

Optionally, in another embodiment, the channel reservation request frame includes a quantity of spatial flows that the first station requests to reserve for the first station; and
- the transmission resource threshold includes a spatial flow threshold.

Optionally, in another embodiment, the channel reservation request frame is a Request To Send RTS frame, and the channel reservation response frame is a Clear To Send CTS frame.

Optionally, in another embodiment, at least one bit of reserved bits of the RTS frame is used to indicate a transmission resource that the first station requests the AP to reserve for the first station, and the reserved bits of the RTS frame include the ninth to the twelfth bits and the fourteenth to the sixteenth bits of the RTS frame.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

The data transmission apparatus 400 of this embodiment of the present invention may correspond to the AP in the data transmission methods of the embodiments of the present invention, and the foregoing and other operations and/or functions of all the modules of the data transmission apparatus 400 are separately for implementing corresponding processes of the methods in FIG. 1 to FIG. 5. For brevity, details are not described herein.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

Figure 8:
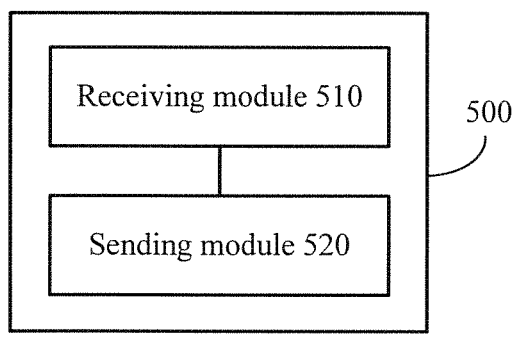
FIG. 8 is a schematic block diagram of a data transmission apparatus according to another embodiment of the present invention.

FIG. 8 shows a schematic block diagram of a data transmission apparatus 500 according to an embodiment of the present invention. As shown in FIG. 8, the apparatus 500 includes:

a receiving module 510, configured to receive a channel reservation response frame sent by an access point AP, where the channel reservation response frame is used to indicate that a first station and M second stations are allowed to send uplink data, and M is an integer greater than or equal to 1; and a sending module 520, configured to send uplink data to the AP according to the channel reservation response frame received by the receiving module 510.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

The receiving module 510 is specifically configured to receive the channel reservation response frame that is sent by the AP according to a channel reservation request frame sent by the first station for requesting to reserve a specific quantity of transmission resources for the first station.

Optionally, the channel reservation response frame is further used to indicate a transmission resource threshold for sending uplink data by the M second stations to the access point AP.

Optionally, a sum of a quantity of transmission resources corresponding to the transmission resource threshold and a quantity of transmission resources used when the first station sends uplink data is less than or equal to a quantity of currently available transmission resources of the AP.

A parameter of a transmission resource reserved for the first station includes: a quantity of spatial flows reserved for the first station.

Correspondingly, the transmission resource threshold includes a spatial flow threshold.

Optionally, the apparatus 500 may be the second station shown in FIG. 1 to FIG. 5. Correspondingly, the sending module 520 is specifically configured to: if there is to-be-sent uplink data, send the uplink data to the AP by using a first transmission resource, where a quantity of the first transmission resources is less than or equal to the quantity of transmission resources corresponding to the transmission resource threshold.

Optionally, in another embodiment, the apparatus 500 may further be the first station shown in FIG. 1 to FIG. 5. Correspondingly, the apparatus 500 further includes:

a detecting module 530, configured to: before the receiving module 510 receives the channel reservation response frame sent by the AP, detect whether a channel is in an idle state.

The sending module 520 is further configured to: if the detecting module 530 detects that the channel remains in an idle state for a preset time period, send a channel reservation request frame to the AP, where the channel reservation request frame is used to request to reserve a transmission resource for the first station for sending uplink data to the AP.

The receiving module 510 is further configured to receive the channel reservation response frame that is sent by the AP according to the channel reservation request frame sent by the sending module 520.

Optionally, in another embodiment, when the apparatus 500 is the first station, a quantity of transmission resources used when the sending module 520 sends uplink data is less than or equal to a quantity of transmission resources that the first station requests to reserve by using the channel reservation request frame.

Optionally, in another embodiment, the channel reservation response frame received by the receiving module 510 is further used to indicate the quantity of transmission resources used when the first station sends uplink data.

Correspondingly, when the apparatus 500 is the first station, the quantity of transmission resources used when the sending module 520 sends uplink data is less than or equal to a quantity of transmission resources indicated in the channel reservation response frame.

Optionally, in another embodiment, the channel reservation request frame is a Request To Send RTS frame, and the channel reservation response frame is a Clear To Send CTS frame.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

Optionally, in another embodiment, at least one bit of reserved bits of the RTS frame is used to indicate a transmission resource that the first station requests the AP to reserve for the first station, and the reserved bits of the RTS frame include the ninth to the twelfth bits and the fourteenth to the sixteenth bits of the RTS frame.

The data transmission apparatus 500 of this embodiment of the present invention may correspond to the first station or the second station in the data transmission methods of the embodiments of the present invention, and the foregoing and other operations and/or functions of all the modules of the data transmission apparatus 500 are separately for implementing corresponding processes of the methods in FIG. 1 to FIG. 5. For brevity, details are not described herein.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

Figure 9:
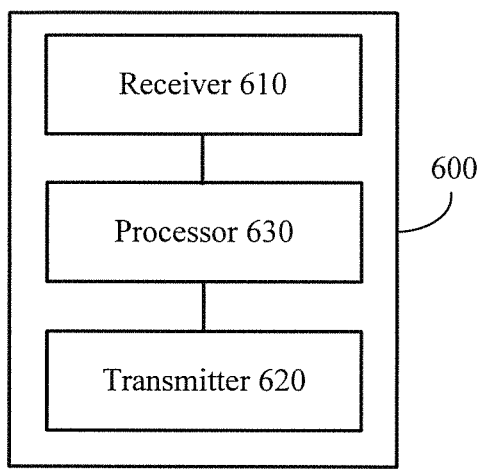
FIG. 9 is a schematic block diagram of a data transmission apparatus according to still another embodiment of the present invention.

FIG. 9 shows a schematic block diagram of a data transmission apparatus 600 according to an embodiment of the present invention.

As shown in FIG. 9, the apparatus 600 includes:
a receiver 610, configured to receive a channel reservation request frame sent by a first station, where the channel reservation request frame is used to request to reserve a transmission resource for the first station for sending uplink data; and
a transmitter 620, configured to send a channel reservation response frame to the first station and M second stations according to the channel reservation request frame received by the receiver 610, where the channel reservation response frame is used to indicate that the first station and the M second stations are allowed to send uplink data, and M is an integer greater than or equal to 1.

The receiver 610 is further configured to receive uplink data that is simultaneously sent by the first station and N second stations of the M second stations according to the channel reservation response frame sent by the transmitter 620, where N is an integer and $1 \leq N \leq M$.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

Optionally, the channel reservation response frame is further used to indicate a transmission resource threshold for sending uplink data by the M second stations to an access point AP. Correspondingly, a quantity of transmission resources used when each second station of the N second stations sends uplink data is less than or equal to a quantity of transmission resources corresponding to the transmission resource threshold.

Optionally, a sum of the quantity of transmission resources corresponding to the transmission resource threshold and a quantity of transmission resources used when the first station sends uplink data is less than or equal to a quantity of currently available transmission resources of the AP.

Optionally, in another embodiment, the quantity of transmission resources used when the first station sends uplink data is less than or equal to a quantity of transmission resources that the first station requests to reserve by using the channel reservation request frame.

Optionally, in another embodiment, the channel reservation response frame is further used to indicate the quantity of transmission resources used when the first station sends uplink data.

Correspondingly, the quantity of transmission resources used when the first station sends uplink data is less than or equal to a quantity of transmission resources indicated in the channel reservation response frame.

Optionally, the transmitter 620 is specifically configured to send, according to the channel reservation request frame received by the receiver 610, the channel reservation response frame to all stations associated with the AP.

Optionally, in another embodiment, as shown in FIG. 9, the apparatus 600 further includes:
a processor 630, configured to: before the transmitter 620 sends the channel reservation response frame to the first station and the M second stations according to the channel reservation request frame received by the receiver 610, group stations associated with the AP.

The transmitter 620 is specifically configured to send, according to the channel reservation request frame received by the receiver 610, the channel reservation response frame to M second stations included in at least one group obtained after the grouping by the processor 630 and the first station.

It should be understood that in this embodiment of the present invention, the processor 630 may be a central processing unit (Central Processing Unit, "CPU" for short), or the processor 630 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

Optionally, in another embodiment, the channel reservation request frame includes a quantity of spatial flows that the first station requests to reserve for the first station.

Correspondingly, the transmission resource threshold includes a spatial flow threshold.

Optionally, in another embodiment, the channel reservation request frame is a Request To Send RTS frame, and the channel reservation response frame is a Clear To Send CTS frame.

Optionally, in another embodiment, at least one bit of reserved bits of the RTS frame is used to indicate a transmission resource that the first station requests the AP to reserve for the first station, and the reserved bits of the RTS frame include the ninth to the twelfth bits and the fourteenth to the sixteenth bits of the RTS frame.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

The data transmission apparatus 600 of this embodiment of the present invention may correspond to the AP in the data transmission methods of the embodiments of the present invention, and the foregoing and other operations and/or functions of all the modules of the data transmission apparatus 600 are separately for implementing corresponding processes of the methods in FIG. 1 to FIG. 5. For brevity, details are not described herein.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

Figure 10:
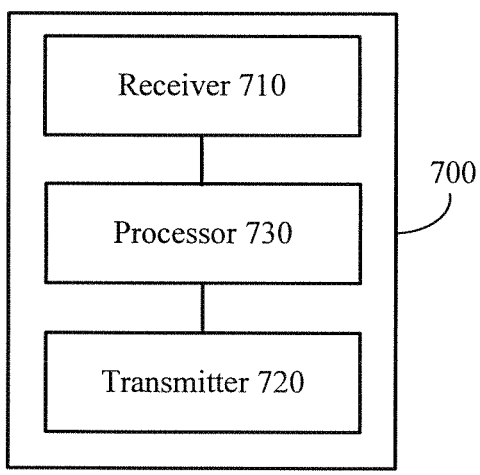
FIG. 10 is a schematic block diagram of a data transmission apparatus according to yet another embodiment of the present invention.

FIG. 10 shows a schematic block diagram of a data transmission apparatus 700 according to an embodiment of the present invention. As shown in FIG. 10, the apparatus 700 includes:

a receiver 710, configured to receive a channel reservation response frame sent by an access point AP, where the channel reservation response frame is used to indicate that a first station is allowed to send uplink data, and the channel reservation response frame is used to indicate a transmission resource threshold for sending uplink data by M second stations to the AP, and M is an integer greater than or equal to 1; and a transmitter 720, configured to send uplink data to the AP according to the channel reservation response frame received by the receiver 710.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience.

The receiver 710 is specifically configured to receive the channel reservation response frame that is sent by the AP according to a channel reservation request frame sent by the first station for requesting to reserve a specific quantity of transmission resources for the first station.

Optionally, the channel reservation response frame is further used to indicate the transmission resource threshold for sending uplink data by the M second stations to the access point AP.

Optionally, a sum of a quantity of transmission resources corresponding to the transmission resource threshold and a quantity of transmission resources used when the first station sends uplink data is less than or equal to a quantity of currently available transmission resources of the AP.

A parameter of a transmission resource reserved for the first station includes: a quantity of spatial flows reserved for the first station. Correspondingly, the transmission resource threshold includes a spatial flow threshold.

Optionally, the apparatus 700 may be the second station shown in FIG. 1 to FIG. 5. Correspondingly, the transmitter 720 is specifically configured to: if there is to-be-sent uplink data, send the uplink data to the AP by using a first transmission resource, where a quantity of the first transmission resources is less than or equal to the quantity of transmission resources corresponding to the transmission resource threshold.

Optionally, in another embodiment, as shown in FIG. 10, the apparatus 700 further includes:

a processor 730, configured to: before the receiver 710 receives the channel reservation response frame sent by the AP, detect whether a channel is in an idle state.

The transmitter 720 is further configured to: if the processor 730 detects that the channel remains in an idle state for a preset time period, send a channel reservation request frame to the AP, where the channel reservation request frame is used to request to reserve a transmission resource for the first station for sending uplink data to the AP.

The receiver 710 is further configured to receive the channel reservation response frame that is sent by the AP according to the channel reservation request frame sent by the transmitter 720.

It should be understood that in this embodiment of the present invention, the processor 730 may be a central processing unit (Central Processing Unit, "CPU" for short), or the processor 730 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

Optionally, in another embodiment, when the apparatus 700 is the first station, a quantity of transmission resources used when the transmitter 720 sends uplink data is less than or equal to a quantity of transmission resources that the first station requests to reserve by using the channel reservation request frame.

Optionally, in another embodiment, the channel reservation response frame sent by the transmitter 720 is further used to indicate the quantity of transmission resources used when the first station sends uplink data.

Correspondingly, when the apparatus 700 is the first station, the quantity of transmission resources used when the transmitter 720 sends uplink data is less than or equal to a quantity of transmission resources indicated in the channel reservation response frame.

Optionally, in another embodiment, the channel reservation request frame is a Request To Send RTS frame, and the channel reservation response frame is a Clear To Send CTS frame.

Optionally, in another embodiment, at least one bit of reserved bits of the CTS frame is used to indicate the transmission resource threshold, and the reserved bits of the CTS frame include the ninth to the twelfth bits and the fourteenth to the sixteenth bits of the CTS frame.

Optionally, in another embodiment, at least one bit of reserved bits of the RTS frame is used to indicate a transmission resource that the first station requests the AP to reserve for the first station, and the reserved bits of the RTS frame include the ninth to the twelfth bits and the fourteenth to the sixteenth bits of the RTS frame.

The data transmission apparatus 700 of this embodiment of the present invention may correspond to the first station or the second station in the data transmission methods of the embodiments of the present invention, and the foregoing and other operations and/or functions of all the modules of the data transmission apparatus 700 are separately for implementing corresponding processes of the methods in FIG. 1 to FIG. 5. For brevity, details are not described herein.

Therefore, according to the data transmission apparatus of this embodiment of the present invention, a first station requests to reserve a transmission resource for the first station, and an AP notifies, according to the transmission resource that the first station requests to reserve, that the first station and M second stations are allowed to send uplink data, so that the first station and N second stations of the M second stations can simultaneously send uplink data to the AP, and the N second stations may send uplink data to the AP without contending with another station for a resource, thereby reducing time-frequency resources of a system when MU-MIMO is implemented, shortening a transmission delay, and improving user experience. In addition, the transmission resource that the first station requests to reserve for the first station is indicated in an RTS frame, and the AP indicates, in a CTS frame, that the first station and the M second stations are allowed to send uplink data, so that the data transmission method in this embodiment of the present invention can be compatible with the existing IEEE 802.11 protocol.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
receiving a channel reservation request frame sent by a first station, wherein the channel reservation request frame is used to request to reserve a transmission resource for the first station for sending uplink data;
sending a channel reservation response frame to the first station and M second stations according to the channel reservation request frame, the channel reservation response frame for indicating the first station and the M second stations are allowed to send uplink data and for indicating a transmission resource threshold for sending uplink data by the M second stations to an access point (AP), and M is an integer greater than or equal to 1; and
receiving uplink data that is simultaneously sent by the first station and N second stations of the M second stations according to the channel reservation response frame, wherein N is an integer and 1≤N≤M, wherein a quantity of transmission resources used when each second station of the N second stations sends uplink data is less than or equal to a quantity of transmission resources corresponding to the transmission resource threshold.

2. The method according to claim 1, wherein a sum of the quantity of transmission resources corresponding to the transmission resource threshold and a quantity of transmission resources used when the first station sends uplink data is less than or equal to a quantity of currently available transmission resources of the AP.

3. The method according to claim 1, wherein:
before sending a channel reservation response frame to the first station and M second stations according to the channel reservation request frame, the method further comprises:
grouping stations associated with the AP; and
sending a channel reservation response frame to the first station and M second stations according to the channel reservation request frame comprises:
sending, according to the channel reservation request frame, the channel reservation response frame to M second stations comprised in at least one group and to the first station.

4. A data transmission method, comprising:
receiving a channel reservation request frame sent by a first station, wherein the channel reservation request frame is used to request to reserve a transmission resource for the first station for sending uplink data;
sending a channel reservation response frame to the first station and M second stations according to the channel reservation request frame, the channel reservation response frame for indicating the first station and the M second stations are allowed to send uplink data and for indicating a quantity of transmission resources used when the first station sends uplink data, wherein the quantity of transmission resources used when the first station sends uplink data is less than or equal to a quantity of transmission resources indicated in the channel reservation response frame; and
receiving uplink data that is simultaneously sent by the first station and N second stations of the M second stations according to the channel reservation response frame, wherein N is an integer and 1≤N≤M.

5. A data transmission method, comprising:
receiving a channel reservation response frame sent by an access point (AP), wherein the channel reservation response frame is used to indicate that a first station and M second stations are allowed to send uplink data, M is an integer greater than or equal to 1, and the channel reservation response frame is further used to indicate a transmission resource threshold for sending uplink data by the M second stations to the AP; and
sending uplink data to the AP according to the channel reservation response frame, wherein a sum of a quantity of transmission resources corresponding to the transmission resource threshold and a quantity of transmission resources used when the first station sends uplink data is less than or equal to a quantity of currently available transmission resources of the AP.

6. A data transmission method, comprising:
receiving a channel reservation response frame sent by an access point (AP), wherein the channel reservation response frame is used to indicate that a first station and M second stations are allowed to send uplink data, M is an integer greater than or equal to 1, and the channel reservation response frame is further used to indicate a transmission resource threshold for sending uplink data by the M second stations to the AP; and
sending uplink data to the AP according to the channel reservation response frame, including, when there is to-be-sent uplink data on the second station, sending, by the second station, the uplink data to the AP by using a first transmission resource, wherein a quantity of the first transmission resources is less than or equal to the quantity of transmission resources corresponding to the transmission resource threshold.

7. A data transmission method, comprising:
when a first station detects that a channel remains in an idle state for a preset time period, sending, by the first station, a channel reservation request frame to an access point (AP) for requesting to reserve a transmission resource for the first station for sending uplink data to the AP;
receiving, by the first station, a channel reservation response frame that is sent by the AP according to the channel reservation request frame, wherein the channel reservation response frame is used to indicate that a first station and M second stations are allowed to send uplink data, and M is an integer greater than or equal to 1; and
sending uplink data to the AP according to the channel reservation response frame.

8. A data transmission method, comprising:
receiving a channel reservation response frame sent by an access point (AP), wherein the channel reservation response frame is used to indicate that a first station and M second stations are allowed to send uplink data, and M is an integer greater than or equal to 1, and the channel reservation response frame is further used to indicate a quantity of transmission resources used when the first station sends uplink data, wherein the quantity of transmission resources used when the first station sends uplink data is less than or equal to a quantity of transmission resources indicated in the channel reservation response frame; and
sending uplink data to the AP according to the channel reservation response frame.

9. A data transmission apparatus, comprising:
a receiver, configured to receive a channel reservation request frame sent by a first station, wherein the channel reservation request frame is used to request to reserve a transmission resource for the first station for sending uplink data;

a transmitter, configured to send a channel reservation response frame to the first station and M second stations according to the channel reservation request frame received by the receiver, the channel reservation response frame for indicating the first station and the M second stations are allowed to send uplink data and for indicating a transmission resource threshold for sending uplink data by the M second stations to an access point (AP), and M is an integer greater than or equal to 1;

wherein the receiver is further configured to receive uplink data that is simultaneously sent by the first station and N second stations of the M second stations according to the channel reservation response frame sent by the transmitter, wherein N is an integer and $1 \leq N \leq M$ and a quantity of transmission resources used when each second station of the N second stations sends uplink data is less than or equal to a quantity of transmission resources corresponding to the transmission resource threshold.

10. The apparatus according to claim 9, further comprising:

a processor, configured to: before the transmitter sends the channel reservation response frame to the first station and the M second stations according to the channel reservation request frame received by the receiver, group stations associated with the AP; and wherein the transmitter is configured to send, according to the channel reservation request frame received by the receiver, the channel reservation response frame to M second stations comprised in at least one group obtained after the grouping by the processor and the first station.

11. A data transmission apparatus, comprising:

a receiver, configured to receive a channel reservation request frame sent by a first station, wherein the channel reservation request frame is used to request to reserve a transmission resource for the first station for sending uplink data;

a transmitter, configured to send a channel reservation response frame to the first station and M second stations according to the channel reservation request frame received by the receiver, the channel reservation response frame for indicating the first station and the M second stations are allowed to send uplink data and for indicating a quantity of transmission resources used when the first station sends uplink data, wherein M is an integer greater than or equal to 1, and the quantity of transmission resources used when the first station sends uplink data is less than or equal to a quantity of transmission resources indicated in the channel reservation response frame.

12. A data transmission apparatus, comprising:

a receiver, configured to receive a channel reservation response frame sent by an access point (AP), wherein the channel reservation response frame is used to indicate that a first station and M second stations are allowed to send uplink data and further used to indicate a transmission resource threshold for sending uplink data by the M second stations to the AP, and M is an integer greater than or equal to 1; and a transmitter, configured to send uplink data to the AP according to the channel reservation response frame received by the receiver, and when there is to-be-sent uplink data, send the uplink data to the AP by using a first transmission resource, wherein a quantity of the first transmission resources is less than or equal to the quantity of transmission resources corresponding to the transmission resource threshold.

13. A data transmission apparatus, comprising:

a receiver, configured to receive a channel reservation response frame sent by an access point (AP), wherein the channel reservation response frame is used to indicate that a first station and M second stations are allowed to send uplink data, and M is an integer greater than or equal to 1;

a transmitter, configured to send uplink data to the AP according to the channel reservation response frame received by the receiver;

a processor, configured to: before the receiver receives the channel reservation response frame sent by the AP, detect whether a channel is in an idle state;

wherein the transmitter is further configured to: when the processor detects that the channel remains in an idle state for a preset time period, send a channel reservation request frame to the AP for sending uplink data to the AP; and wherein the receiver is configured to receive the channel reservation response frame sent by the AP according to the channel reservation request frame sent by the transmitter.

14. A data transmission apparatus, comprising:

a receiver, configured to receive a channel reservation response frame sent by an access point (AP), wherein the channel reservation response frame is used to indicate that a first station and M second stations are allowed to send uplink data, and M is an integer greater than or equal to 1; and a transmitter, configured to send uplink data to the AP according to the channel reservation response frame received by the receiver, wherein the channel reservation response frame is further used to indicate a quantity of transmission resources used when the first station sends uplink data, wherein the quantity of transmission resources used when the first station sends uplink data is less than or equal to a quantity of transmission resources indicated in the channel reservation response frame.

* * * * *